United States Patent [19]

Bleidt et al.

[11] 4,214,474

[45] Jul. 29, 1980

[54] DENSITY MONITORING APPARATUS

[75] Inventors: Rolf Bleidt; Joachim Nasterlack, both of Hanau; Kurt Neubeck, Miltenberg; Achim Gareus, Amorbach, all of Fed. Rep. of Germany

[73] Assignees: BBC Brown, Boveri & Co., Ltd., Baden, Switzerland; Alexander Wiegand GmbH Co., Klingenberg, Fed. Rep. of Germany

[21] Appl. No.: 948,473

[22] Filed: Oct. 4, 1978

[30] Foreign Application Priority Data

Oct. 4, 1977 [DE] Fed. Rep. of Germany ....... 2744549

[51] Int. Cl.² .............................................. G01N 9/26
[52] U.S. Cl. ......................................... 73/30; 73/49.3; 73/708
[58] Field of Search ................... 73/30, 49.3, 708

[56] References Cited

U.S. PATENT DOCUMENTS

| | | | |
|---|---|---|---|
| 2,491,548 | 12/1949 | Branson | 73/30 |
| 2,989,863 | 6/1961 | Camilli | 73/49.3 |
| 3,075,390 | 1/1963 | Sheppard | 73/708 |
| 3,269,186 | 8/1966 | Hebenstreit | 73/49.3 |

FOREIGN PATENT DOCUMENTS 1106317 7/1955 France ..................... 73/708

*Primary Examiner*—S. Clement Swisher
*Attorney, Agent, or Firm*—Burns, Doane, Swecker & Mathis

[57] ABSTRACT

A density monitoring gauge is disclosed which modifies a Bourdon tube manometer by introducing a compensating element between the end of the Bourdon tube and the pointer actuating mechanism. The compensating element is designed to accommodate for changes in circumferential length of the Bourdon tube induced by temperature as well as to compensate for pressure changes in a closed system attributed directly to changes in gas temperature within that closed system. The compensating means may consist of a bimetallic member having an Ω configuration. Alternatively, the compensating means may include a pair of synthetic material rods connected by a thermally stable member such that linear thermal expansion of the rods is additively connected between the tube spring and the pointer actuating mechanism. The density measuring device is desirably used in connection with sulfur hexafluoride insulated electrical switching gear. If desired, the density monitor may be arranged with an electrical alarm to indicate the presence of a leak.

7 Claims, 3 Drawing Figures

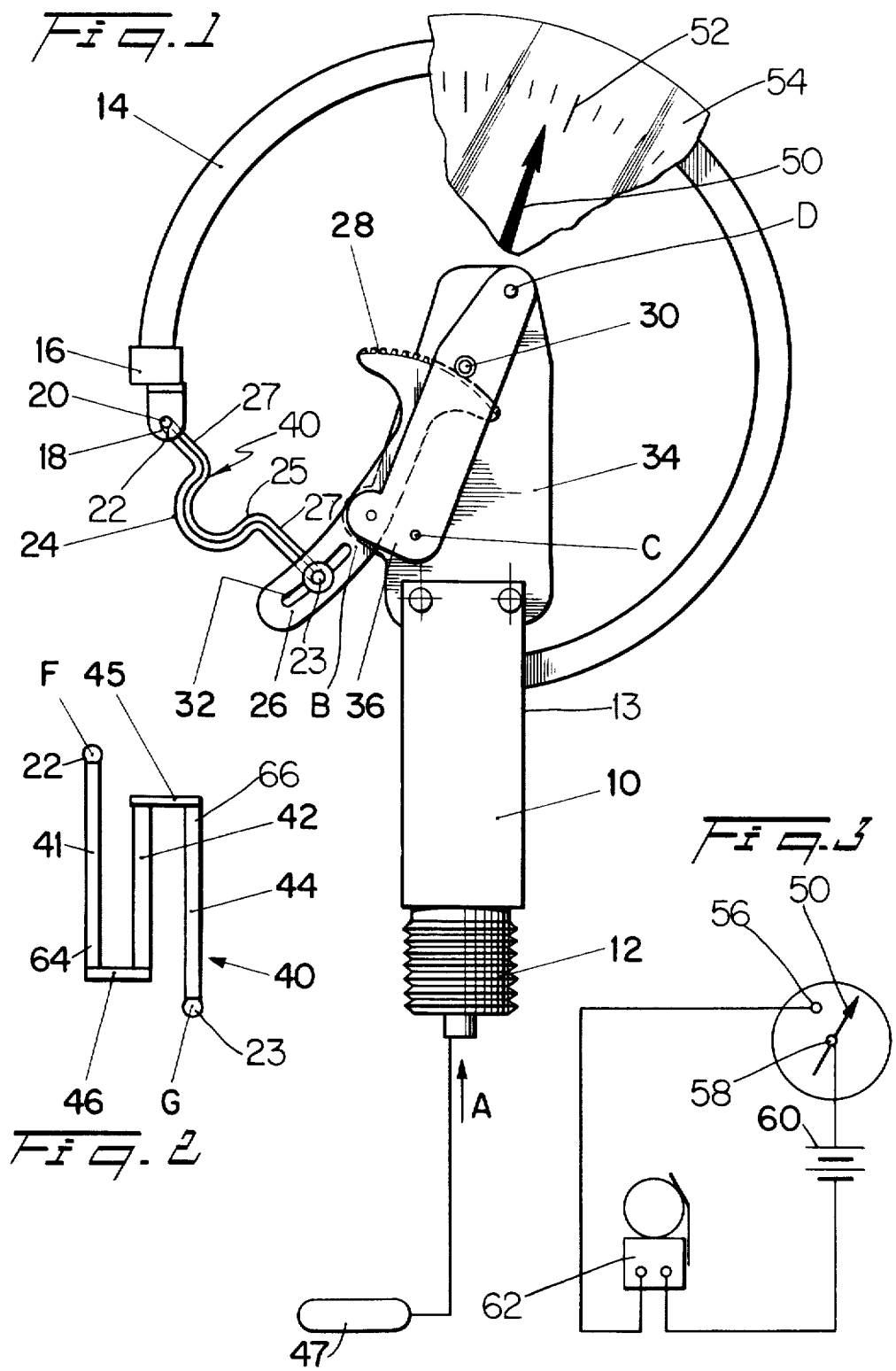

DENSITY MONITORING APPARATUS

BACKGROUND OF THE INVENTION

This invention generally relates to an apparatus for monitoring density of a gas inside a pressurized container. More particularly, the invention concerns apparatus for monitoring density of gaseous sulfur $SF_6$ hexafluoride in switch gears and switching devices for use with high voltage electrical current.

In gas inclosed and insulated electrical switch gear for high voltage current, sulfur hexafluoride is sometimes used in place of air due to its high dielectric strength in comparison to that of atmospheric air. When sulfur hexafluoride is used, both its density and its pressure are important parameters that must be monitored: density being important due to its relationship to dielectric strength or insulating power of the gas; and pressure being important as a measure of the quenching capability of the gas. Accordingly, it becomes necessary to install monitoring devices in electrical switch gear for both density and pressure.

Typically, gaseous sulfur hexafluoride is contained in a closed pressurized system, in part due to its expense. Accordingly, changes in ambient temperature can be reflected in pressure variations within the system. Due to the classical relationship between density, pressure, and temperature under well known laws of the physics of gases, a temperature increase in a closed system is accompanied by a corresponding pressure increase. Thus, in the event a leak should occur during a period of increasing temperature, a pressure responsive gauge would not indicate the presence of the leak. in a closed system, gas density would drop immediately when a leak occurs and would thereby signal the presence of a leak.

Systems for monitoring gas density in a pressurized container are currently available. For example, one system utilizes a cylinder having a piston which acts on a spring-loaded ram. The spring-loaded ram has an end provided with a shoulder and includes an internal bore which accommodates a second loose ram. The second loose ram passes through the shoulder and has a neck beyond which the loose ram also extends. Between the shoulder of the spring-loaded ram and the neck of the loose ram are a plurality of bimetallic disks designed in such a manner as to equalize the pressure change attributable to a change in temperature. Thus, pressure-induced movement of the ram caused by a temperature change in the system is eliminated and resulting movement of the ram is a measurement of density. Such a density monitor is used particularly with sulfur hexafluoride in gas-insulated and enclosed switch gear and represents a specially manufactured system. Typically, the ram arrangement provides an electrical indication of the existence of a leak.

OBJECTS AND SUMMARY OF THE INVENTION

It is a general object of the present invention to provide a gas density monitoring device which substantially reduces the cost of known monitoring systems. It is another object of the present invention to provide a gas density monitoring device which makes use of the high coefficient of thermal expansion available in presently available synthetic materials.

Yet another object of the present invention is to provide a gas density monitoring device which can be manufactured by modifying a currently available type of pressure measurement device.

The present invention accomplishes these objects, as well as many others, in connection with a tube spring pressure measuring device, such as a Bourdon tube. Movement of such a tube spring is registered against a stationary scale by means of a pointer operated by a mechanism which causes rotational movement of the pointer in response to displacement of a free end of the tube spring. Connected between the end of the tube spring and the pointer operating assembly is a temperature change compensating element. This compensating element is designed so as to offset any change in position of the end of the tube spring caused by a pressure change solely attributable to a temperature change through the functional relationship between gas temperature and gas pressure in a closed system. The temperature compensation element is also designed to accommodate for any positional change at the end of the tube spring which may result from linear thermal expansion of the tube spring element itself in addition to the thermally induced pressure variations of a closed system.

In construction, the temperature compensating element may be fashioned from a bimetallic strip or from a member of synthetic material having a suitable linear coefficient of thermal expansion. Where a bimetallic element is used, the element can be designed most advantageously in a U shape or in the shape of the Greek letter omega, $\Omega$, whereas, if the element is made of a synthetic material, a pair of synthetic material rods may be interconnected by a rod of metal so that their thermal expansion is additive. With this arrangement, the linear coefficient of thermal expansion for the synthetic material rod is substantially greater than the linear coefficient of thermal expansion for the metal. In this latter example, thermally induced length changes in the two rods of synthetic material will be cumulative thereby permitting a greater range of thermal compensation.

BRIEF DESCRIPTION OF THE DRAWINGS

The above as well as many other objects and advantages of the present invention will be apparent to those skilled in the art when this specification is read in conjunction with the drawings wherein like reference numerals have been applied to like elements and wherein:

FIG. 1 is a view of a tube spring density monitor having a first embodiment for the temperature compensating element and having housing portions broken away in the interest of clarity;

FIG. 2 is a detailed view of a second embodiment of the temperature compensating element in accordance with the present invention; and FIG. 3 is a schematic illustration of an electrical circuit suitable for accoustically indicating a drop in density.

DESCRIPTION OF THE PREFERRED EMBODIMENTS

Turning now to FIG. 1, a density monitoring device in accordance with the present invention is illustrated. The monitoring device includes a spring support 10 provided with an externally threaded end portion 12. This threaded end portion 12 permits the density monitor to be screwed into a pipe communicating with a closed pressure system 47. Extending outwardly from a side 13 of the spring support 10 is a curved tube spring or Bourdon tube 14. The tube spring 14 is hollow and communicates with pressure in the closed system by means of a passage extending through the spring support 10 and communicating with an opening at the threaded end portion 12 (see arrow A).

The second end of the tube spring 14 is closed off by an end piece 16 which is sealed to the tube spring 14 so as to prohibit fluid leakage therefrom. Extending from the end piece 16 in the direction of tube spring curvature is a tab 18 which is securely fastened to the end piece 16 in a suitable conventional manner. The tab 18 includes a transverse bore 20 extending therethrough and defining the terminal point of the tube spring 14. The tube spring 14 itself is a pressure responsive device. Changes in fluid pressure introduced to the tube spring 14 through the base 10 cause movement of the tab 18 toward and away from the spring support 10 in accordance with the variation of pressure.

One end 22 of a temperature compensating means 40 extends through the transverse bore 20 of the tab so as to connect the temperature compensating means 40 with the tube spring 14. The other end 23 of the temperature compensating means 40 is connected to a segment lever 26 which is pivotally mounted about point B relative to upper and lower support plates 34, 36. The upper support plate 34 is attached directly to and carried by the spring support 10, whereas the lower plate 36 is fastened to the upper plate at points C, D by suitable conventional fasteners and bushings which maintain the desired spatial relationship between the two plates 34, 36.

The segment lever 26 includes a toothed rim 28 which defines a segment of a circular arc centered about the pivot point B of the segment member 26. A pinion 30 supported on a shaft which extends between the upper and lower support plates 34, 36 and engages the arcuate toothed rim 28. This pinion shaft also carries a pointer 50 which correlates with a scale 52 provided on the face 54 of the gauge.

Thus, it will be seen that movement of the end tab 18 of the tube spring 14 is translated by the segment lever 26 into rotational movement of the pinion 30 and the associated pointer 50 relative to the fixed scale 52. To permit adjustment of the temperature compensating means 40 so as to give a desired reading on the scale 52 by the pointer 50. The segment lever 26 also includes an arcuately extending calibration slot 32.

Turning now to the temperature compensating means 40 depicted in FIG. 1, a bimetallic element 24 which is U-shaped or shaped like the Greek letter omega, $\Omega$, may be connected between the bore 20 of the end tab 18 and the adjustment slot 32 of the segment lever 26. This bimetallic element 24 is designed specifically in such a manner that it compensates for the changes in the circumferential length of the tube spring 14 caused by corresponding changes in temperature of the tube spring material. Moreover, the bimetallic member 24 is designed to provide compensation for thermally induced pressure changes in the closed gas system. In this connection, the bimetallic element 24 is designed such that the change in linear distance between the first end 22 and the second end 23 increases for a given temperature increase by an amount which corresponds to the change in distance between the bore 20 of the tube spring 14 relative to the slot 32 for the same temperature increase. In this manner, the extension of the temperature compensating means 40 negates or equalizes the movement of the tube spring 14 caused solely by the increase or decrease in pressure attributable to a gas temperature increase or decrease, respectively.

For example, if it is assumed that the pressurized gas which is located in a closed container can vary through a temperature range of $-25°$ to $+40°$ C., the pressure of the gas will then change essentially as a functional relation to the gas temperature. Standard commercially available pressure gauges would measure the corresponding pressure fluctuations for this temperature range and the tube spring would expand or contract in accordance with the pressure variation. The temperature of the tube spring itself would be yet another additional influence on the pressure reading. In this connection the circumferential length of the tube spring would also change as a function of temperature.

Assume that a mean pressure of 6 bar (87.0 psia) can be assumed to represent the neutral position of the pointer 50 on the gauge 52. If the temperature of the gas now decreases, the gas pressure within the closed system 47 decreases and the tube spring 14 contracts. In this example, the bimetallic member 24 must be designed in such a manner that it will compensate for this movement of the tab 18 toward the segment lever 26. That is, an opening 25 defined between the two end portions 27 of the bimetallic member must decrease in width in response to a corresponding change in temperature so that the pointer 50 does not indicate a change in density. As density is inversely proportional to specific volume, specific volume may also be monitored by a device designed as specified herein.

In the event that pressure in the closed system 47 drops as a result of a gas leak, the change in system pressure will exceed that change caused solely by changing temperature. Accordingly, the pointer 50 will display relative movement as to the scale 52.

In the event that it is desired to acoustically indicate changes in density, the pointer 50 may be arranged to close a pair of electrical contacts 56, 58 (see FIG. 3) and establish an electrical current between a current source 60 and a suitable conventional bell or alarm 62.

Another embodiment of the compensating means is illustrated in FIG. 2. In the second embodiment of the compensating means 40, the one end 22 is connected to the bore 20 in the end tab 18 whereas the second end 23 is connected to the adjustment slot 32 of the segment lever 26. A pair of generally parallel rods 41, 44 are fashioned from synthetic material having a length and coefficient of thermal expansion selected to match the change in position of the tube spring 14 and tab 18 caused by a pressure change in the closed system 47 resulting from a corresponding temperature change.

Each rod 41, 44 has two ends. As noted above, one end 22 of the rod 41 is attached to the tab and one end 23 of the second rod 44 is attached to the adjustment slot 32 of the segment lever 26. The second end 64 of the first rod 41 and the second end 66 of the second rod 44 are fixedly connected to a metal rod 42 which is parallel to the first and second rods 41, 44. Ends of this metal rod 42 are each connected by a corresponding tab 45, 46 to a corresponding second end 64, 66 of the first and second rods 41, 44. In addition, the metal rod is pointed toward the end 22.

Preferably, the linear coefficient of thermal expansion of both rods 41, 44 is identical and substantially greater than the linear coefficient of thermal expansion for the metallic rod 42. Conversely, the coefficient of thermal expansion for the rod is small in comparison with the coefficient of thermal expansion for the synthetic rods 41, 44. With this arrangement of the synthetic rods, thermally induced length changes in the two synthetic rods 41, 44 are cumulative or additive so that the resulting length change between the ends 22 23 correspond to that distance which would be attained if only one longer rod of the same synthetic material were provided. This arrangement has the advantage that dimensions of the temperature compensating means 40 can be maintained relatively compact.

The compensating means 40 may also be designed with either bimetallic elements or synthetic rods such that atmospheric pressure differences will also be corrected. It is noted that atmospheric pressure influence on sulfur hexafluoride insulated switch gear is generally so low that it can be disregarded. Nonetheless, by eliminating the influence of ambient air pressure, it is possible to employ the above-described density monitoring devices in conjunction with systems measuring absolute pressure. In this arrangement, a reference pressure is supplied and a pressure gauge of the foregoing type can then be installed in the container. In any event, commercially available pressure gauges can and should be used in the density monitoring device of this invention. Where higher or lower sensitivity is required, either tube springs or plate membranes can be effectively used to measure density. The compensating apparatus disclosed by this invention is readily adaptable to temperature compensation in connection with all conventional types of pressure gauges. Accordingly, the compensating means described above, either as Ω-shaped bimetallic element or as a plurality of suitably dimensioned rods of synthetic material, may be employed with any conventional pressure gage.

It should also be noted that while the embodiment of FIG. 2 disclosed merely one pair of synthetic rods, the concept may also be expanded to use either a single rod or more than two rods made of the synthetic material.

It should now be apparent that there has been provided in accordance with the present invention a novel density monitoring device not heretofore known. In addition, it will be apparent to those skilled in the art that numerous modifications, variations, substitutions, and equivalents exist for the features of the invention which do not materially depart from the spirit and scope thereof. Accordingly, it is expressly intended that all such modifications, variations, substitutions, and equivalents which fall within the spirit and scope of the invention as defined in the appended claims be embraced thereby.

What is claimed is:

1. Apparatus for monitoring density of gas in a pressurized container comprising:
    pressure response means including a Bourdon tube for sensing the pressure of the gas and providing pressure-related movement;
    indicating means including a segment lever, operable in response to the pressure-related movement of the Bourdon tube for providing a visual indication of the pressure-related movement; and
    thermal compensating means connected between the pressure responsive means and the segment lever of the indicating means, being the mechanical connection for transmitting pressure-related movement of the Bourdon tube to the indicating means, and operable to equalize the pressure-related movement attributable to changes in gas temperature such that the indicating means indicates gas density.

2. The apparatus of claim 1 wherein:
    the compensating means includes a tie rod connected between the Bourdon tube and the segment lever.

3. The apparatus of claim 1 or 2 wherein the compensating means includes a thermally responsive bimetallic member.

4. The apparatus of claim 3 wherein the bimetallic member is U-shaped.

5. The apparatus of claim 1 or 2 wherein the compensating means includes a first rod of synthetic plastic material having a linear coefficient of thermal expansion selected to match the pressure-related movement due to the gas temperature changes.

6. The apparatus of claim 5 wherein:
    the compensating means includes a second rod parallel to the first rod and fabricated of the same material, each rod having first and second ends, one end of the first rod attached to the pressure responsive means, and one end of the second rod attached to the indicating means; and
    a tie element having a coefficient of thermal expansion small in comparison to the rod material is connected between the second end of the first rod and the second end of the second rod.

7. The apparatus of claim 6 wherein the tie element is metal.

* * * * *